US011769387B2

(12) United States Patent
Bar-Ilan et al.

(10) Patent No.: US 11,769,387 B2
(45) Date of Patent: Sep. 26, 2023

(54) METHOD AND APPARATUS FOR DETECTING DROWNING

(71) Applicant: Lynxight Ltd., Yokneam Illit (IL)

(72) Inventors: Omer Bar-Ilan, Haifa (IL); Roee Mor, Haifa (IL)

(73) Assignee: LYNXIGHT LTD., Yokneam-Illit (IL)

(*) Notice: Subject to any disclaimer, the term of this patent is extended or adjusted under 35 U.S.C. 154(b) by 0 days.

(21) Appl. No.: 17/048,096

(22) PCT Filed: Apr. 14, 2019

(86) PCT No.: PCT/IL2019/050419
§ 371 (c)(1),
(2) Date: Oct. 16, 2020

(87) PCT Pub. No.: WO2019/202585
PCT Pub. Date: Oct. 24, 2019

(65) Prior Publication Data
US 2021/0150191 A1    May 20, 2021

Related U.S. Application Data

(60) Provisional application No. 62/658,118, filed on Apr. 16, 2018.

(51) Int. Cl.
G08B 21/08       (2006.01)
G06T 7/80        (2017.01)
(Continued)

(52) U.S. Cl.
CPC ............ G08B 21/08 (2013.01); G06T 7/194 (2017.01); G06T 7/248 (2017.01); G06T 7/60 (2013.01);
(Continued)

(58) Field of Classification Search
None
See application file for complete search history.

(56) References Cited

U.S. PATENT DOCUMENTS 5,023,593 A * 6/1991 Brox .................... G08B 21/082
340/567
5,043,705 A   8/1991 Rooz
(Continued)

FOREIGN PATENT DOCUMENTS

| CN | 107622505 A |   | 1/2018  |               |
|----|-------------|---|---------|---------------|
| CN | 108538052   | * | 9/2018  | ... G08G 1/1033 |
| CN | 108852362   | * | 11/2018 | ... A61B 5/4089 |

OTHER PUBLICATIONS

Poolview, https://web.archive.org/web/20180409222339/https://www.poolview.co.uk/poolview (Year: 2018).*

(Continued)

Primary Examiner — Randolph I Chu

(57) ABSTRACT

A method, system and computer program product, the method comprising: obtaining a multiplicity of images taken by one or more overhead capture devices overlooking a body of water having a surface; detecting a person depicted in at least some images from the multiplicity of images; determining for images in the images, whether the image depicts the person in substantially vertical position in the at least some images said determining performed upon one or more characteristics extracted from each image; and subject to determining that the person is not in substantially vertical position in the at least some images, taking an action.

19 Claims, 5 Drawing Sheets

(51) Int. Cl.
- *G06T 7/73* (2017.01)
- *G06T 7/246* (2017.01)
- *G06T 7/60* (2017.01)
- *H04N 7/18* (2006.01)
- *G06V 40/20* (2022.01)
- *G06V 40/10* (2022.01)
- *G06T 7/194* (2017.01)
- *G06V 20/52* (2022.01)

(52) U.S. Cl.
CPC ............... *G06T 7/73* (2017.01); *G06T 7/80* (2017.01); *G06V 20/52* (2022.01); *G06V 40/10* (2022.01); *G06V 40/20* (2022.01); *H04N 7/18* (2013.01); *G06T 2207/20076* (2013.01); *G06T 2207/30196* (2013.01); *G06T 2207/30232* (2013.01)

(56) References Cited

U.S. PATENT DOCUMENTS

| | | | | |
|---|---|---|---|---|
| 5,886,630 | A * | 3/1999 | Menoud | G08B 21/082 367/153 |
| 7,330,123 | B1 * | 2/2008 | Grahn | G08B 21/082 340/553 |
| 8,237,574 | B2 | 8/2012 | Hawkeye | |
| 2007/0273765 | A1 * | 11/2007 | Wang | G06K 9/38 348/152 |
| 2008/0048870 | A1 * | 2/2008 | Laitta | G08B 25/08 340/573.6 |
| 2009/0303055 | A1 * | 12/2009 | Anderson | G08B 21/086 340/573.6 |
| 2012/0269399 | A1 | 10/2012 | Anderson | |
| 2016/0340006 | A1 * | 11/2016 | Tang | B64C 39/024 |
| 2018/0040223 | A1 * | 2/2018 | Bodi | G08B 21/086 |
| 2018/0089980 | A1 * | 3/2018 | Snyder | G06K 9/00771 |
| 2018/0197405 | A1 * | 7/2018 | Li | G08B 21/088 |
| 2019/0087548 | A1 * | 3/2019 | Bennett | G06F 21/10 |
| 2020/0020221 | A1 * | 1/2020 | Cutler | H04L 67/12 |
| 2020/0053320 | A1 * | 2/2020 | Mor | G06K 9/00335 |
| 2020/0311227 | A1 * | 10/2020 | Bennett | G06N 20/00 |
| 2021/0174073 | A1 * | 6/2021 | Bar-Ilan | G06T 7/246 |
| 2021/0269149 | A1 * | 9/2021 | Culver | G08G 1/205 |

OTHER PUBLICATIONS

Claff, "Field of view of lenses by focal length", Nikonians.org (Year: 2013).*
CamerEye (Installation Tips, Nov. 2016) https://camereye.ai/installation-tips/ (Year: 2016).*
ISR for PCT/IL2019/050419 (Jun. 23, 2019).
Extended European Search Report for Application 19788696.3 dated Dec. 8, 2021 (8 pages).

\* cited by examiner

METHOD AND APPARATUS FOR DETECTING DROWNING

CROSS REFERENCE TO RELATED APPLICATIONS

The present invention is a non-provisional utility patent application that is based upon and claims benefit of priority filing date of U.S. provisional patent application Ser. No. 62/658,118 filed Apr. 16, 2018 for "Drowning Detection from Overhead Camera", which is incorporated herein by reference in its entirety.

TECHNICAL FIELD

The present disclosure relates to monitoring bodies of water such as swimming pools in general, and to a method and apparatus for detecting hazardous situations in the bodies of water, in particular.

BACKGROUND

Drowning accidents in swimming pools, ponds, lakes or other closed bodies of water are a disaster not only to the victim and his or her family, but to a larger circle of people, including friends, colleagues, other swimmers or bathers and their families, and in particular the owners or operators of the pool, life guards, or other people who are held responsible for the accident. Such people, in addition to their own feelings of guilt and remorse, often face harsh financial consequences.

However, guarding against such accidents, and in particular during crowded hours or in crowded areas of the pool, is not an easy task. It is often impossible to view the full area of the pool at once and pay attention to many occurrences. Thus situations can develop quickly into disastrous results at one area while the guard is looking at another area. Additionally, it is hard for a person such as the life guard to focus over long periods of time, without losing the attention and concentration even for a short period.

Thus, monitoring swimming pools in general, and identifying people in dangerous situations in particular, is a critical and challenging task.

BRIEF SUMMARY

One exemplary embodiment of the disclosed subject matter is a computer-implemented method comprising: obtaining a multiplicity of images taken by at least one overhead capture device overlooking a body of water having a surface; detecting a person in at least some images from the multiplicity of images; determining for images in the images, whether the image depicts the person below or above a surface of the body of water, said determining performed upon one or more characteristics extracted from each image; and subject to determining that the person is depicted below the surface in at least a predetermined part of the images, taking an action. Within the method, taking the action is optionally further subject to the person being depicted substantially motionless over a first period of time which at least partially overlaps with a second period of time during which the images were captured. Within the method, one device of the overhead capture devices optionally has a viewing angle of at most 70° between a first line connecting the device and a projection of the device on a plane containing the surface, and a second line connecting the device and a point on the surface farthest from the device. Within the method, one device of the overhead capture devices optionally captures at least a part of a bottom surface the body of water. Within the method, said detecting optionally comprises differentiating a background and foreground of the image. Within the method, said determining whether the image depicts the person below or above the surface optionally comprises: determining a probability that the image depicts the person below the surface; and determining that the image depicts the person below the surface subject to the probability exceeding a predetermined threshold. Within the method, said determining whether the image depicts the person below or above the surface optionally comprises: determining two or more probabilities that each of two or more images depict the person below the surface; and determining that the images depict the person below the surface in accordance with a joint estimation of the probabilities. Within the method, it is optionally determined that the person is depicted above the surface in one or more images due to an image analysis error. Within the method, it is optionally determined that the person is depicted above the surface in one or more images due to due to a moving pattern consistent with drowning. Within the method, one or more of the characteristics is optionally selected from the group consisting of: a color histogram; an edge; an edge histogram; a gradient histogram; a contour edge between colors; a contour edge between shapes; a distinct feature; a unique pattern; a corner; an edge; a color co-occurrence matrix; and a texture. Within the method, the action is optionally selected from the group consisting of: setting off an alarm; sounding an alarm; generating a visual alert; generating a vibrating alert; and notifying a life guard.

Another exemplary embodiment of the disclosed subject matter is a method, comprising: obtaining a multiplicity of images taken by one or more overhead capture devices overlooking a body of water having a surface; detecting a person depicted in at least some images from the multiplicity of images; determining for images in the images, whether the image depicts the person in substantially vertical position in the at least some images said determining performed upon one or more characteristics extracted from each image; and subject to determining that the person is not in substantially vertical position in the at least some images, taking an action. Within the method, taking the action is optionally further subject to the person being depicted substantially motionless over a first period of time, which at least partially overlaps with a second time period during which the at least some images were captured. Within the method, determining whether the person is in substantially vertical position optionally comprises: obtaining a second multiplicity of images taken by a second overhead capture device overlooking the body of water; and determining that the person is in substantially vertical position if a direction of the person is substantially vertical in the images, and if the direction of the person as depicted in at least a subset of images from the second multiplicity of images coincides with a vertical direction at a location of the person as seen by the second capture device in at least some images from the subset. Within the method, determining whether the person is in substantially vertical position optionally comprises determining if a direction of the person as depicted in at least a subset of images coincides with a vertical direction at a location of the person as captured by the at least one capture device. Within the method, the vertical direction at a location is optionally determined using a calibration of the at least one overhead capture, wherein a direction perpendicular to the surface as captured by the at least one capture device is determined. Within the method, determining whether the person is in substantially vertical position optionally comprises: determining a length of a projection of the person as; determining a height of the person as depicted in at least some images; and subject to a ratio between the length and the height being below a predetermined value, determining that the person is in substantially vertical position. The method can further comprise calibrating the at least one overhead capture device. Within the method, the length of the projection is optionally determined using a calibration of the overhead capture device in which a vector between two points on an image is translated into an actual length. Within the method, the length of the projection is optionally determined using a calibration of the overhead capture device in which a vector between two points on an image is translated into an orientation on water surface. Within the method, one of the overhead capture devices optionally has a viewing angle of at most 70° between a first line connecting the device and a projection of the device on a plane containing the surface, and a second line connecting the device and point on the surface farthest from the device. Within the method, one of the devices optionally captures at least a part of a bottom surface of the body of water. Within the method, said detecting optionally comprises differentiating a background and foreground of the image. Within the method, said determining whether the image depicts the person in substantially vertical position optionally comprises: determining a probability that the image depicts the person in a non-vertical position; and determining that the person is not in vertical position subject to the probability exceeding a predetermined threshold. Within the method, said determining whether the image depicts the person in substantially vertical position optionally comprises: determining two or more probabilities that each of two or more images depict the person in a non-vertical position; and determining that the images depict the person in a non-vertical position in accordance with a joint estimation of the probabilities. Within the method, one or more of the characteristics is optionally selected from the group consisting of: a color histogram an edge; an edge histogram; a gradient histogram; a contour edge between colors; a contour edge between shapes; a distinct feature; a unique pattern; a corner; an edge; a minimal containing ellipse; and a texture. Within the method, the action is optionally selected from the group consisting of: setting off an alarm; sounding an alarm; generating a visual alert; generating a vibrating alert; and notifying a life guard.

Yet another exemplary embodiment of the disclosed subject matter is a system having a processor, the processor being adapted to perform the steps of: obtaining a multiplicity of images taken by at least one overhead capture device overlooking a body of water having a surface; detecting a person in at least some images from the multiplicity of images; determining for images in the images, whether the image depicts the person below or above a surface of the body of water, said determining performed upon one or more characteristics extracted from each image; and subject to determining that the person is depicted below the surface in at least a predetermined part of the images, taking an action.

Yet another exemplary embodiment of the disclosed subject matter is a system having a processor, the processor being adapted to perform the steps of: obtaining a multiplicity of images taken by one or more overhead capture devices overlooking a body of water having a surface; detecting a person depicted in at least some images from the multiplicity of images; determining for images in the images, whether the image depicts the person in substantially vertical position in the at least some images said determining performed upon one or more characteristics extracted from each image; and subject to determining that the person is not in substantially vertical position in the at least some images, taking an action.

Yet another exemplary embodiment of the disclosed subject matter is a computer program product comprising a non-transitory computer readable medium retaining program instructions, which instructions when read by a processor, cause the processor to perform: obtaining a multiplicity of images taken by at least one overhead capture device overlooking a body of water having a surface; detecting a person in at least some images from the multiplicity of images; determining for images in the images, whether the image depicts the person below or above a surface of the body of water, said determining performed upon one or more characteristics extracted from each image; and subject to determining that the person is depicted below the surface in at least a predetermined part of the images, taking an action.

Yet another exemplary embodiment of the disclosed subject matter is a computer program product comprising a non-transitory computer readable medium retaining program instructions, which instructions when read by a processor, cause the processor to perform: obtaining a multiplicity of images taken by one or more overhead capture devices overlooking a body of water having a surface; detecting a person depicted in at least some images from the multiplicity of images; determining for images in the images, whether the image depicts the person in substantially vertical position in the at least some images said determining performed upon one or more characteristics extracted from each image; and subject to determining that the person is not in substantially vertical position in the at least some images, taking an action.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
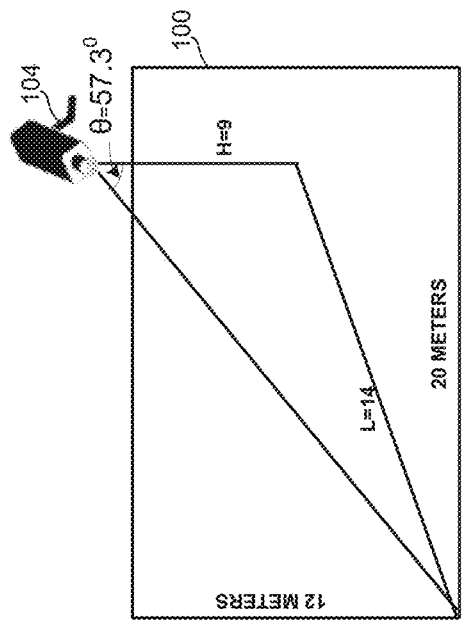
FIGS. 1A, 1B, 1C and 1D show exemplary configurations for monitoring a pool with overhead cameras, in accordance with some exemplary embodiments of the disclosed subject matter.

The term "pool" or "swimming pool" used in this specification should be expansively construed to cover any kind of a body of water in which people can bathe or swim, including, for example, also a pond, a lake, or the like.

The term "camera" or "video camera" used in this specification should be expansively construed to cover any kind of capture device, capturing still images or video streams.

The term "swimmer" used in this specification should be expansively construed to cover any person at a pool or at the pool area, whether the person is inside the water or not, whether the person is swimming or not, or even knows how to swim, or the like. Unless specifically indicated otherwise, the terms "swimmer" and "person" are used interchangeably.

Monitoring pools is a critical and challenging task. Even if a life guard is present at a pool, people may drown or lose consciousness in a very short time, such that if the life guard is looking the other way, precious time may be lost until the situation is detected, at which stage it may already be too late.

Thus, one technical problem is the need to identify hazardous situations in a pool, for example a person being under the water surface for over a predetermined period of time.

Another technical problem is the need to identify a situation of a person losing consciousness and therefore lying horizontally on the water surface.

Yet another technical problem is to detect such situations using a system which is easy and inexpensive to install and maintain.

Drowning usually begins with 30-60 seconds of active struggle. If not rescued, the person can become motionless and usually submerged, either due to loss of consciousness or shock. After 1-3 minutes in this phase, permanent brain damage may occur. Therefore, it is vital to detect such situations and rescue the person within about 1 minute. Naive methods that aim to detect drowning or other critical situations may suffer from significant drawbacks. Non-limiting drawbacks are discussed below.

Some methods may employ overhead cameras that capture the pool area, and detect swimming movements, which are typical of a drowning person. Such movements include movement of the torso and the limbs. However, such detection is hard to implement and as a result may have many misses, or cause many false alarms, to a degree that the method may become useless and impractical.

Other methods may employ underwater cameras, and attempt to detect motionless people in the part of the frame matching the volume below the water surface. The installation and maintenance of such cameras are complex and expensive, inter alia, since multiple cameras may be required, for example 8-12 cameras may be used for covering a 12 m×25 m pool. In addition, coordinating between multiple cameras adds to the complexity of the solution.

Further methods may use sonar systems, which map the pool volume and detect motionless and submerged swimmers. Such systems are also complex and expensive to install and maintain.

Yet further methods may use wearable devices worn by swimmers, which combine motion and depth sensors that detect when the swimmer is underwater and motionless. Such devices are cumbersome, and many people are reluctant to use them on a regular basis.

One technical solution of the disclosure comprises one or more overhead cameras that, individually or in combination, capture the entire surface of the pool. Images taken by the camera may be analyzed to detect that a person is submerged in the water for at least a predetermined of time. The analysis may be made upon one or more visual characteristics of each image, such as a color histogram, an edge or gradient histogram, contours edges between colors and shapes on the person, distinct features and unique patterns, corners, edges, texture, and the like. If a person is determined to be under the water for at least the predetermined period of time, a drowning alert may be raised. In some embodiments, it may also be determined whether the person is motionless, for example the person's center of mass hasn't changed for a predetermined period of time. In such embodiments, the drowning alert may be subject also to the person is motionless, i.e. a drowning alert will be issued if the person is under the water and motionless, for at least a predetermined amount of time.

In some embodiments, it may not be required that all images during the time period depict the person under the water, or that the person is motionless throughout the period. In such embodiments, some images may depict or be determined to depict the person under the water due to an analysis error, or due to drowning patterns, especially with kids. For example, one drowning pattern of kids may involve the kid trying to gasp for air, and being able to lift his head out of the water a few times before drowning. Thus, it may be required that at least a predetermined part of the images depict the person under the water. Additionally or alternatively, it may be required that the person is motionless in at least a predetermined part of the time frame, in which the images that depict the person under the water are captured.

Another technical solution of the disclosed subject matter relates to determining from images taken by the overhead camera, a position of a person in the water, e.g., whether the person is substantially vertical or not. If the person is substantially vertical, then it may be assumed that the person is not drowning. However, if the person is not vertical, he or she may be unconscious, in which case an alert may be raised. If it is determined that the person is in a non-vertical position, then it may be assumed that the person is in a horizontal position. If, however, it is determined that the person is in a vertical position, this may be due to an ambiguity in the image. Thus, determining whether the person is in a vertical position may be enhanced by the usage of two cameras, such that only if the person is depicted in a vertical position in the two cameras, he may indeed be assumed to be in vertical position. In another embodiment, whether the person is indeed in a vertical positon may be determined by employing further algorithms for identifying the position, such as measuring the length of the person's projection on the surface, as detailed below.

In some exemplary embodiments, a drowning alert may be raised if the person is at a non-vertical position, and is determined to be motionless during at least a predetermined part of the time in which the person is also non-horizontal.

Yet another technical solution of the disclosed subject matter relates to the installation of one or more overhead cameras. The cameras may be installed to provide an overhead look of the entire water surface of the pool. Additionally or alternatively, the cameras may be installed so as to provide, for each location at the pool's water surface, at least one view in which the viewing angle is above a predetermined angle. Such a requirement may provide an overhead view that is useful for computer vision techniques. Additionally or alternatively, the cameras may be installed so as to provide coverage of a substantial portion of the bottom of the pool, such as of at least about 80% of surface of the bottom, about 90%, or the like.

One technical effect of the disclosure relates to detecting a hazardous situation, in which a person is submerged in the water for at least a predetermined period of time. Detecting this situation, which is hard for a human guard to notice, and even further if the person is motionless for a second period of time which at least partially overlaps with the period of time, can provide a strong indication of drowning. Early detection of this situation can save the life of the person.

Another technical effect of the disclosure relates to detecting another hazardous situation, in which a person is at a non-vertical position for least a predetermined period of time. Detecting this situation, and even more so if the person is motionless for a second period of time, that overlaps, at least partially, with the period of time, can provide a strong indication of unconsciousness and hence drowning. Early detection of this situation can save the life of the person.

It will be appreciated that detecting the two hazardous situations may be performed by the same system and on the same captured images.

Yet another technical effect of the disclosure relates to detecting the above-mentioned situations using visual appearance of persons captured in images, taken by an overhead camera. This provides for easy installation, operation and maintenance of a corresponding system.

In the current disclosure, the overhead camera may comprise one or more cameras located higher than the surface of the water at the monitored pool, and fully capturing, individually or in combination, the surface of the pool. The height of the camera above the surface may be denoted as H, and the distance between a vertical projection of the camera on the plane of the water surface, and point P on the surface which is farthest from the projection of the camera is denoted by L. Thus, L/H is tan(θ) wherein θ denotes the angle to the farthest point P.

As the value of θ are smaller, images may be clearer and there may be less occlusions and distortions in images of the pool being captured, for example occlusions created by swimmers other than a swimmer being monitored. Thus, smaller angles are generally preferable. It will be appreciated that as the camera is positioned higher or closer to the geometric center of the pool, the value of H increases, or the value of L decreases, respectively, which decreases the size of θ.

In some exemplary embodiments, the value of θ may not exceed a threshold of about 60°, about 65°, about 70°, or the like. In some exemplary embodiments, for each location within the pool, at least one camera has an angle θ below the threshold with respect to the location.

It will be appreciated that in case of angular view into the depth of the pool, the water may create distortions which may be augmented.

In some exemplary embodiments, the camera may be positioned in a height above the height of a life guard's eyes. For example, if a typical life guard has the height of about 1.80 meters, his eyes may be located at a height of about 1.65 meters. The camera may be positioned above such height. In some cases, the life guard may be using a tower or an elevated chair, allowing him to sit at height of about 3 meters. The camera may be positioned above such height.

In some exemplary embodiments, placing the camera above the pool or close to an edge of the pool may provide a few advantages: the camera can capture volume down to the bottom of the pool; occlusions by other swimmers or by people walking by the pool are avoided; "blind zones" created by the pool walls are avoided or reduced; and the distance the light travels within the water is minimized, thus providing for higher clarity and less distorted images.

These advantages contribute to the accuracy of analyzing the captured images and extracting visual characteristics therefrom.

FIG. 1A shows an exemplary embodiment, in which the camera is positioned above the pool geometric center at a height of 6 m above the pool. Assuming a rectangular pool having dimensions of 20 m×12 m, θ is of about 62.9°.

Figure 1B:
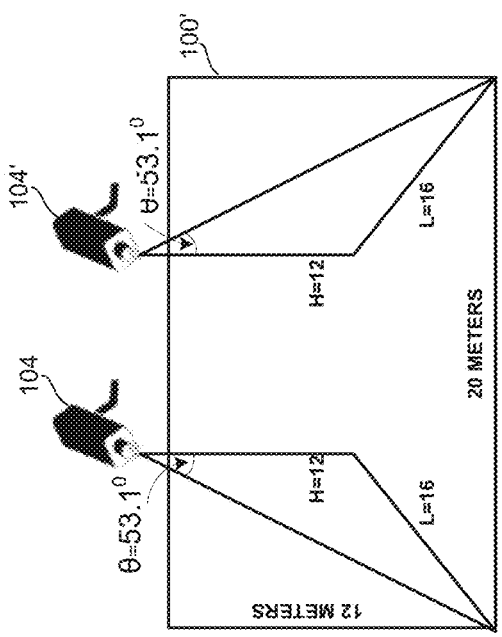

FIG. 1B shows a different configuration in which the camera is located at height of 9 meters, above the pool but not above the geometric center of the pool. As shown in FIG. 1B, for the same pool, locating the camera such that L=14 m provides for θ of about 57.3°.

Figure 1C:
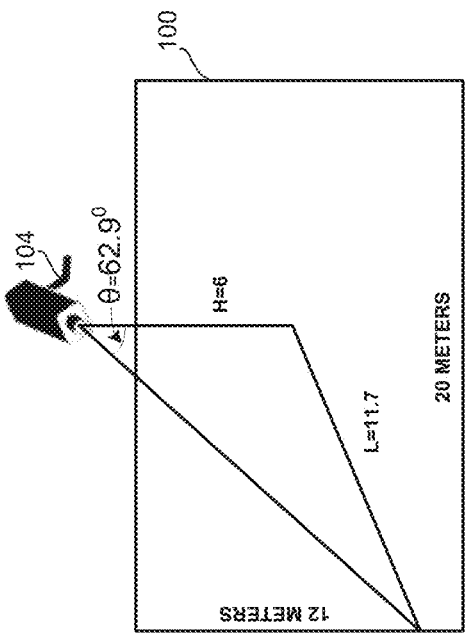

FIG. 1C shows a further configuration, in which the camera is positioned at a height of 15 m above the water surface plane, such that the projection of the camera on the water surface plane is extremal to the pool. In this exemplary case, L=27.1 m, which provides for θ of about 61°.

Figure 1D:
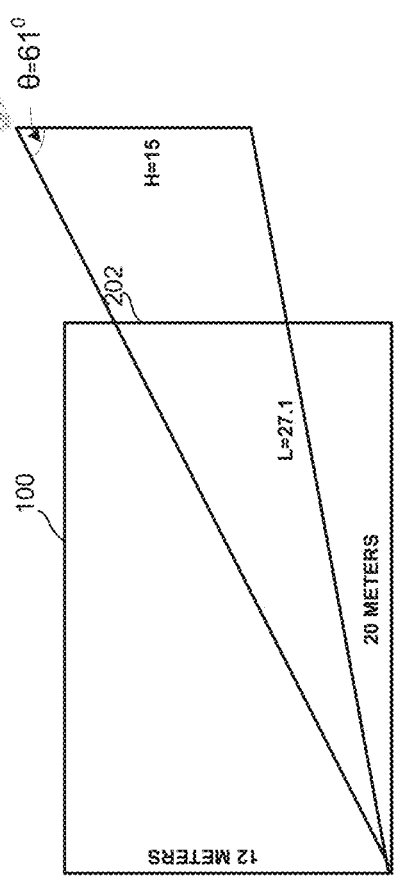

FIG. 1D shows a further configuration, in which two cameras are used for covering the full pool area of a larger pool, having dimensions of 20 m×50 m. In this configuration, the cameras are located at a height of 12 m, and such that L=16 m, thus providing for θ of about 53.1°. It will be appreciated that in this configuration, L is the maximal distance to a point that is not closer to another camera.

In further embodiments, two cameras may be used and located at either side of the pool, for example externally to the short sides of the pool.

Figure 2:
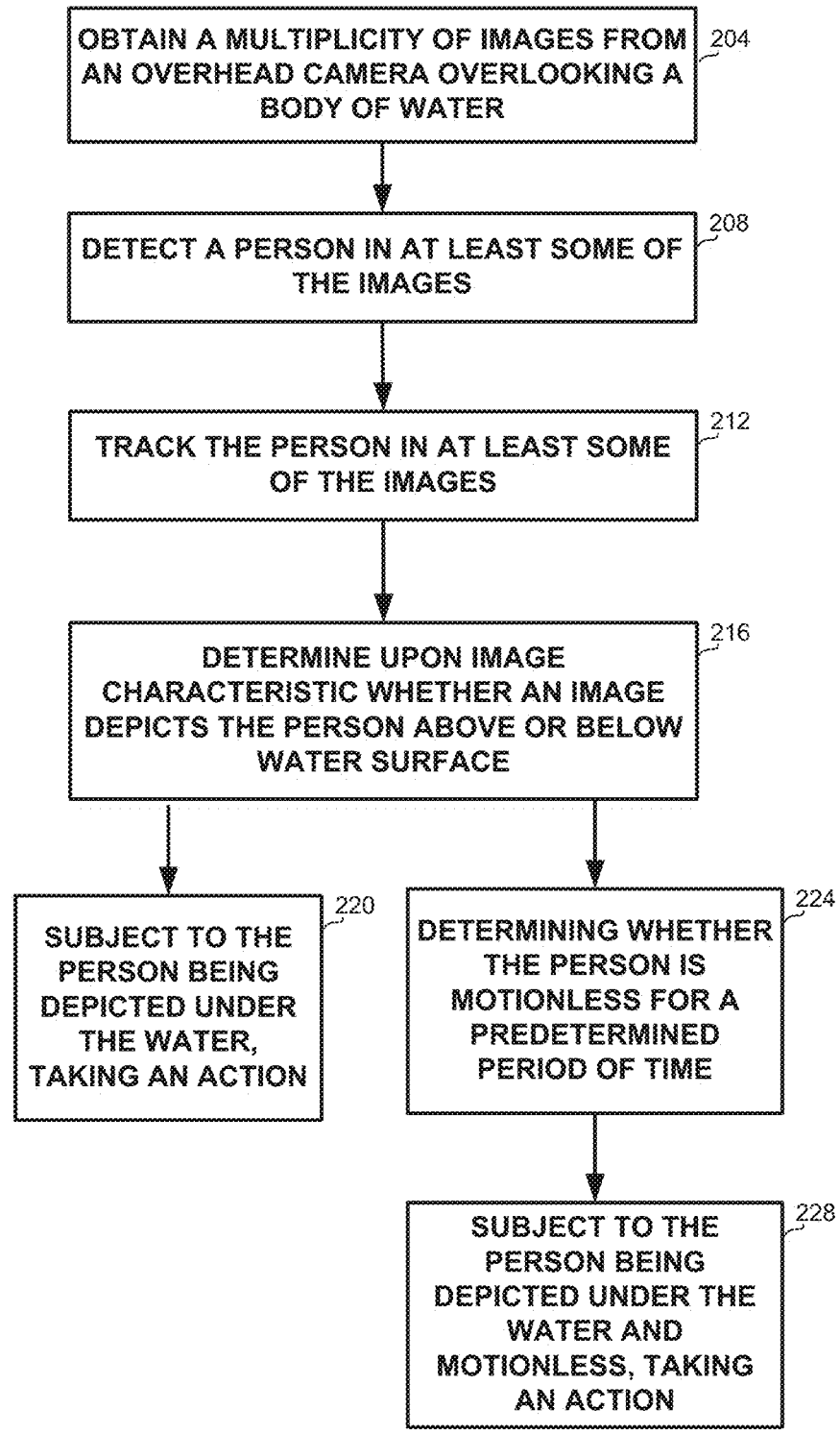
FIG. 2 shows a flowchart of steps in a method for determining whether a person is depicted above or below the water surface, and taking an action if required, in accordance with some exemplary embodiments of the disclosed subject matter.

Referring now to FIG. 2, showing a flowchart of steps in a method for determining whether a person is depicted above or below the water surface, and taking an action if required.

On Step 204, a multiplicity of images may be received from one or more cameras overlooking a pool, as described in association with FIGS. 1A-1D above. The images may be received in any format and via any channel, for example Local Area Network, Wi-Fi, cellular, or any other wired or wireless manner. In some embodiments, the images may be received as a video stream.

On Step 208, a person may be detected in one or more images. It will be appreciated that although the disclosure relates to detecting and analyzing one person, multiple persons may be detected in any of the images, and the analysis may continue as described below in respect to each detected person. The person may be detected using any background/foreground detection technique, such as but not limited to temporal averaging, Gaussian Mixture Model (GMM), also referred to as mixture of Gaussians (MOG) background estimation, Robust Principle Component Analysis (RPCA), subspace learning, and background subtraction.

On Step 212, the person may be tracked in an image relatively to a preceding image, meaning that the person appearing in a first mage is associated with and assumed to be the same person appearing in a second image, thus providing for tracking the person over a multiplicity of images. Tracking can be performed using any desired technique, for example as detailed in patent application titled "A Method and Apparatus for Swimmer Tracking" filed on the same day and assigned to the same applicant as the current application. Additionally or alternatively, tracking can use any video tracking techniques such as but not limited to patch similarity tracking, kernel based tracking, and contour tracking. Tracking can utilize, for example, color histograms, interest point detectors, texture descriptors, and edge detection techniques for determining transforms or edges between face and hair, edges or contours created by the swimming suit, or the like. The edges or other characteristics may be calculated for the person or for the image as a whole, or for parts of the person or parts of the image. It will be appreciated that a person may be tracked in images capturing the person before entering into the water, for example on the pool side, and then continue tracking the person within the water.

On Step 216, it may be determined for each detected person whether the person is submerged, i.e., below the water surface, or at least partially above the water. Determination may be performed based on visual characteristics extracted from the image.

For example, in some embodiments, characteristics or descriptors of each image or a detected person may be collected over one or more images, and compared to further images. Since the location of the pool relative to the camera is known, a person may be tracked before entering the water, when it is known that the person is outside the water. Characteristics may be obtained during this time, such that when one or more characteristic changes significantly over a short period of time, for example one second, five seconds, ten seconds, thirty seconds, or the like, and the change exceeds a predetermined size, the person may have changed his or her position relatively to the water, for example entered the water. This comparison may also be valid regarding parts of the image, or the person, for example the persons head.

In some embodiments, the characteristics or descriptors may be compared to predetermined characteristics or descriptors. For example, characteristics may be obtained a-priori, which are typical of submerged persons or above water persons. Determining whether the person is submerged or not may then be performed upon the difference between the predetermined characteristics or descriptors and the ones obtained from the images as received. Thus, certain characteristics may indicate above/below water regardless of the change from preceding images.

The characteristics or descriptors may include but are not limited to any one or more of the following: a color histogram, an edge or gradient histogram, contours, edges between colors or shapes on the person, distinct features, unique patterns, corners, edges, a color co-occurrence matrix, and texture.

Table 1 below summarizes some differences between the appearance of visual descriptors for objects, including persons, above or below the water surface.

TABLE 1

| Distinct features | Well defined, clear borders | Fuzzy, blurred |
|---|---|---|
| Texture | Homogenous, patterns exist | Heterogeneous, appearing random |

In some exemplary embodiments, a color histogram may comprise a probability distribution over the range of possible values for each color, for one or more color channels (e.g. RGB, HSV, LAB). A color histogram may be created when a person is outside the water. If a significant change has occurred in further images, the probability of the color distribution of a following image in relation to the histogram is below a predetermined threshold, meaning that the person may have entered the water, or vice versa.

In further embodiments, a pre-determined color co-occurrence matrix may be compared to the corresponding data from captured images, thus differentiating between persons above and below water.

In some exemplary embodiments, an edge or gradient histogram may comprise a statistical description of the gradients in different directions within an area of the image, such as one or more areas at which the person is detected. In some exemplary embodiments, the difference between the values of adjacent horizontal pixels may be the gradient in the horizontal direction. A statistical description can be the average of the all the gradients, the standard deviation of the all the gradients, the 90th percentile, etc. In some exemplary embodiments, an internal gradient histogram may be provided describing the gradients within the areas where the person is detected. Additionally or alternatively, an external gradient histogram may be provided depicting the gradient on the border between the portion of the image representing the person and the pool.

In some exemplary embodiments, contour edges between colors or shapes on the person may be used, for example face/hair or body/swimsuit borderline. The contour edges may be provided in terms of shape and length. For example, a contour detection algorithm may be employed and the top N (e.g., 5) longest contours may be obtained therefrom. From the N longest contours any one or more of the following attributes may be extracted: length, curvature, distance from the center of the person, or the like. Additionally or alternatively, the attributes may be extracted from some function or percentile of the contours, for example mean length, median curvature and so forth. Similar to the gradient histogram, such information may be obtained from internal contours within the person's image, and/or external contours on the borders between the person and the pool. Significant changes in any of these features or characteristics, for example disappearance or blurring of contours or edges, may indicate, as above, that the person has entered the water, and vice versa.

In some exemplary embodiments, distinct features and unique patterns, corners and edges may be extracted and used as features. For example, a pattern on a swim cap, swimsuit straps appearance on person's back, borders between swimsuit and body, large tattoos, border between hair and face, etc. Such features may be identified in the person's images, tracked and utilized.

In further embodiments, computer vision descriptors (e.g. Scale-Invariant Feature Transform (SIFT), Speeded Up Robust Features (SURF), or Features from Accelerated Segment Test (FAST)) may be used to describe and represent various parts of the persons either above or below the water surface.

In some exemplary embodiments, one or more textures of each person may be represented using co-occurrence distribution and utilized.

In some exemplary embodiments, when underwater, water surface ripples and light rays which bend in the transition between water and air, may together cause visual effects that can be used to separate between an above water and an underwater person depicted in the images.

In some exemplary embodiments, the shifting of hue of the person may be used to differentiate between an above water and an underwater person depicted in the images.

In some exemplary embodiments, spatial frequency analysis (e.g. Laplacian pyramid) may be used to differentiate between an above water and an underwater person depicted in the images.

In some exemplary embodiments, variance and frequency variability of colors and textures may be used to differentiate between an above water and an underwater person depicted in the images.

It will be appreciated that whether a person is above or below the water surface may or may not be a binary decision. In some embodiments, a grade may be provided indicating the probability that the person is submerged, such that the person may be considered submerged if the probability exceeds a threshold. In some embodiments, the person may be considered submerged based on a joint estimation determined upon a multiplicity of images. For example, a probability may be determined for each image, and a sum, an average, or any other calculation may integrate the probabilities to determine whether the person is submerged.

On Step 220, it may be determined whether the person is depicted under the water for at least a predetermined period of time, for example 10 seconds, thirty seconds, or the like. If the person is indeed under the water for at least the predetermined period of time, an action may be taken, such as setting off an alert, calling a lifeguard, calling or sending a message to another person in charge, or the like. It will be appreciated that the duration of time may not have to be continuous. For example, if up to a predetermined number of images from a longer series of images depict the person outside the water, it may still be determined that the situation is hazardous and an alert may be raised. For example, in one or more images it may be erroneously determined that the person is above the water, while the person is under the water. In further examples, a drowning pattern, common especially with children, may cause them to raise their heads over the water for short periods of time and then sink again, for a number of times. By ignoring such short sequences of images in which the person is determined to be out of the water, or identifying such patterns, further drowning cases can be detected and eliminated.

In some exemplary embodiments, on Step 224 it may be determined whether the person is substantially motionless for at least a predetermined period of time, which fully or partially overlaps with the period of time the person is determined to be under the water. A person being substantially motionless may be defined as the center of mass of the person within the image being unchanged, or change in at most a predetermined distance, for example 10 cm, 20 cm, 50 cm, or the like.

In such embodiments, then on Step 228 an alert may be raised if the person is determined to be under the water for at least a first predetermined period of time, and motionless for at least a second predetermined period of time, wherein the first and second periods of time have at least a predetermined overlap.

Figure 3:
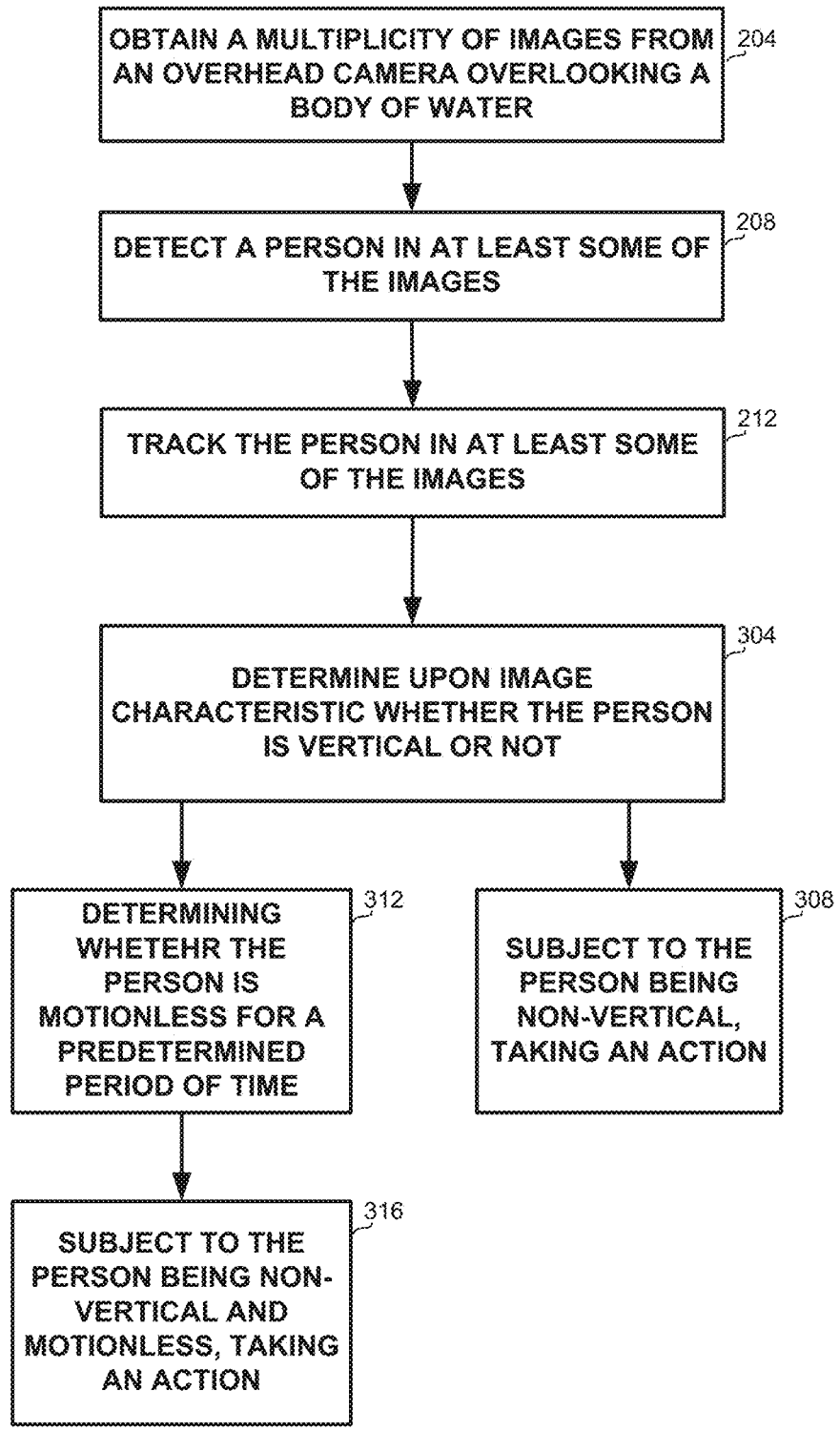
FIG. 3 shows a flowchart of steps in a method for determining a position of a person in a pool, and taking an action if required, in accordance with some exemplary embodiments of the disclosed subject matter.

Referring now to FIG. 3, showing a flowchart of steps in a method for determining a position of a person in a pool, and taking an action if required.

Step 204 of obtaining a multiplicity of images, Step 208 of detecting persons within the image, and Step 212 of tracking the person over multiple images may be performed as detailed in association with FIG. 2 above.

On Step 304, it may be determined upon image characteristics whether the principal direction of the body of a non-submerged person depicted in the image is not vertical, in which case the person may be assumed to be in horizontal position. The characteristic may be selected from the group consisting of: a color histogram; an edge; an edge histogram; a gradient histogram; a contour edge between colors; a contour edge between shapes; a distinct feature; a unique pattern; a corner; an edge; a minimal containing ellipse surrounding the person; and a texture. This may be utilized, since people who are relatively motionless for an extended period of time (for example over 30 seconds) in the pool, and are not submerged, could be, for example, conscious at which case they are at an approximately vertical position, for example, a person who is standing with his feet on the pool's floor; or unconscious and approximately at a horizontal position, for example a person who is drowning and is floating on the water surface. Thus, it may be determined from images of a video stream taken by an overhead camera whether a non-submerged person in a pool is non-vertical, and may therefore be drowning. The disclosed subject matter provides for determining whether the person is mostly horizontal, i.e., the body principal direction is on the water surface plane, or mostly vertical, i.e., the body principal direction is perpendicular to the water surface plane, by estimating the person's body principal direction as projected on the image.

It will be appreciated that whether a person is submerged or not may be performed as detailed in association with FIG. 2 above. However, while in the method of FIG. 2 the hazardous cases where those in which the person is submerged, the hazardous cases in FIG. 3 are those in which the person is non-submerged, e.g., lying on the water surface.

It will be appreciated that if a person is submerged in the water, the principal direction may not be estimated due to computational complexity. In some exemplary embodiments, Table 2 below summarizes the risk assessment options:

TABLE 2

|  | Submerged | Not submerged |
| --- | --- | --- |
| Vertical | Cannot assess risk using | Standing - no risk |
| Horizontal | body principal direction | Floating - risk of drowning |

In some exemplary embodiments, the body principal direction can be estimated using images taken by a single camera, without distance measurement. This is advantageous over systems using stereo vision or 3D scene estimation, as installation and maintenance are easier and less expensive. However, when using a single camera, ambiguity may exist for certain directions, such that it cannot be always determined whether the person's direction is vertical or horizontal.

Figure 4:
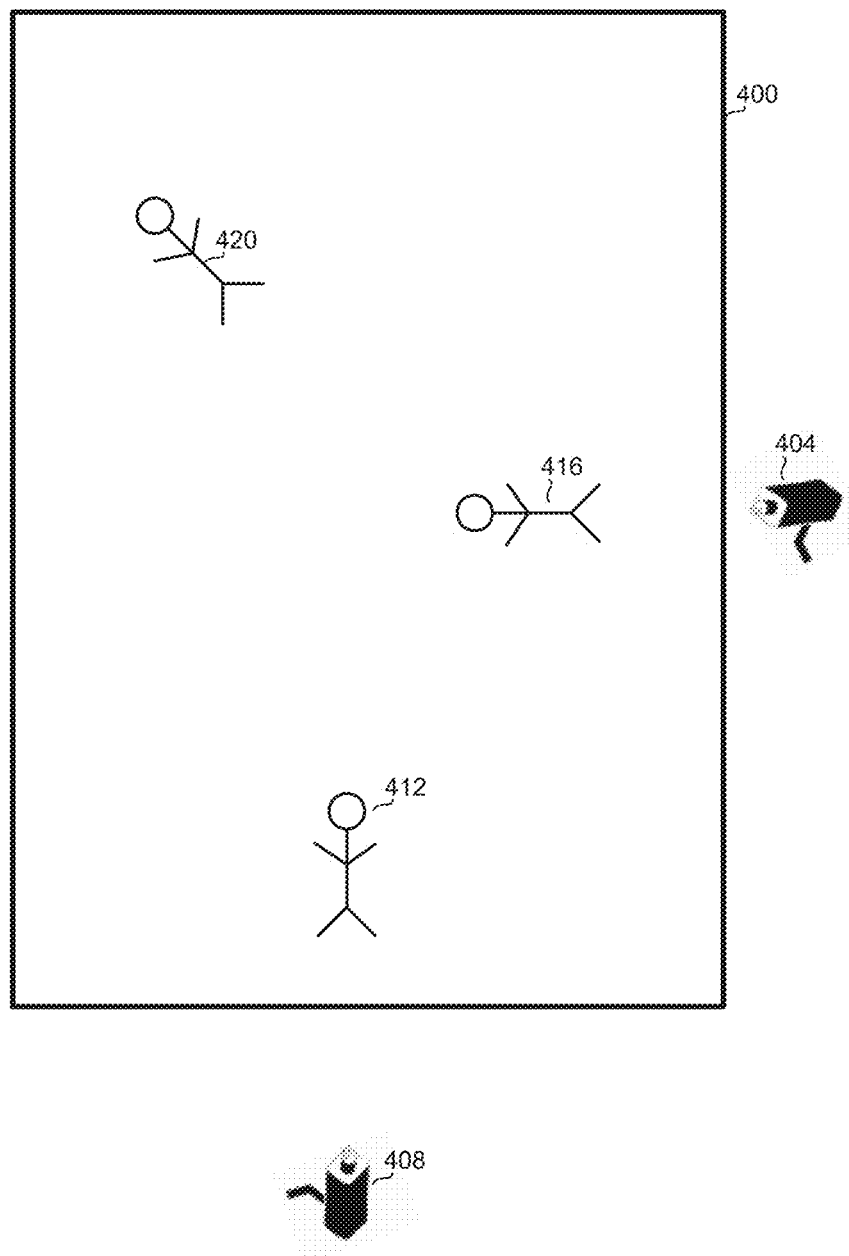
FIG. 4 shows an exemplary swimmer situation in a pool monitored by two overhead cameras, in accordance with some exemplary embodiments of the disclosed subject matter.

For example, referring to FIG. 4, showing Pool 400 captured by Cameras 404 and 404, and swimmers 412, 416 and 420. Camera 404 can determine that Swimmer 412 and Swimmer 420 are horizontal, but cannot tell the direction of Swimmer 416. Camera 408, however, can tell that Swimmer 416 and Swimmer 420 are horizontal, but cannot tell the position of Swimmer 412.

In some exemplary embodiments, determining the direction of a person depicted in an image may be performed by standard 2D image processing and analysis tools, such as segmentation of the torso and Principal Component Analysis (PCA), or enclosing ellipse fit.

In some embodiments, whether the person is in vertical position may be determined upon comparing the position of the person as depicted in an image to a vertical vector at the location of the person within the pool.

In some exemplary embodiments, unambiguously determining the direction of a person may be performed by measuring the length of the projection of the person onto the image. Such measuring may use pre-calibration of the camera. Calibration may take into account the intrinsic parameters and characteristics of the camera, as well as the extrinsic ones related to camera and pool location, height and orientation in a coordinate frame. Calibration may include the association of vectors having a location, direction and length on a captured image of the pool surface, with real world length. It will be appreciated that calibration need not be performed for each such vector, but for a representative number of vectors, such that other vectors may be estimated therefrom, for example by interpolation, with an error that does not exceed a predetermined percentage. For example, the direction perpendicular to the water surface in representative locations, as captured by the camera may be determined and stored.

Given an image captured by the camera, a vector representing an object depicted in the image, for example a person, may be determined as the vector between two points on the object. For example, a person may be represented as a vector connecting the feet and the top of the head of the person, bottom part of the torso and top part of the torso, or the like. The distance in the global coordinate system between the two points, which is indicative of the length of the person as depicted in the image may then be calculated, using the camera calibration.

The length measurement may be performed in an ongoing manner, for example as the person is tracked as described in association with Step 212, and a maximal encountered length may be stored as the person's height. Once a larger length is measured, the height may be updated.

Since the camera is overlooking the pool, then if the person is in a horizontal position, the person is in full view of the camera, and the length of the projection of the body on the pool plane is close to the person's true height.

When the person is vertical, the length of the projection of the body is significantly shorter than the true height. Thus, the ratio between the projection length on the pool plane and the true height may indicate the position: when it is larger than a first predetermined threshold, such as 0.7-0.9, for example about 0.8, the pose is prominently horizontal. When it is below a second predetermined threshold, such as 0.2-0.6, for example about 0.5, the pose is prominently vertical. Values in between the first and second thresholds may be classified as "diagonal" pose.

In some exemplary embodiments, refraction may be taken into account in the calculation: the camera position may be known, including its height and the angle relative to each point in the pool. The ratio between water and air refraction indexes may also be known. Using such information, the angle at which the light waves break may be computed and be used for correction of such effects and a more precise determination of the true height.

It will be appreciated that the length calculation and comparison may be performed for the whole body, or for a part thereof, such as the torso.

Calculating the length of the projection enables the determination of whether person 412 as captured by camera 408 is vertical or not, and similarly for person 416 as captured by camera 404.

In some embodiments, the determination whether a person position is vertical or not may be achieved by the usage of two cameras, without having to determine the length. If the person is horizontal in at least one of the images, then the person may be considered as horizontal, and appropriate action may be taken. For example, in FIG. 4, it can be determined upon images captured by Camera 404 that Swimmers 420 and 412 are non-vertical an alert related to Swimmers 412 and 420 may be raised. For Swimmer 416, it cannot be always determined whether Swimmer 416 is horizontal or not from an image captured by Camera 404. However, it can be determined in most cases. Additionally or alternatively, it may be determined upon an image captured by Camera 408 that Swimmer 416 is non-vertical, thus an alert may be raised regarding Swimmer 416 as well.

Referring now back to FIG. 3, on Step 308, subject to determining that the person is non-vertical, an action may be taken similarly to Step 220 of FIG. 2.

In some exemplary embodiments, on Step 312 it may be determined whether the person motionless for at least a predetermined period of time, as detailed in association with Step 224 of FIG. 2 above.

If the person is horizontal or non-vertical, for example when the ratio between the length of the person's projection in an image and the person's length is larger than the first or the second threshold, and the person is motionless for at least a predetermined period of time, then the action may be taken.

In some embodiments, if the person is determined to be horizontal, it may also be determined from the images whether the person is lying face up or face down. Unconscious people tend to lie face down, thus an alert may be raised only if the person is lying face down, or an alert may be raised earlier if the person is lying face down than if he is lying face up.

Figure 5:
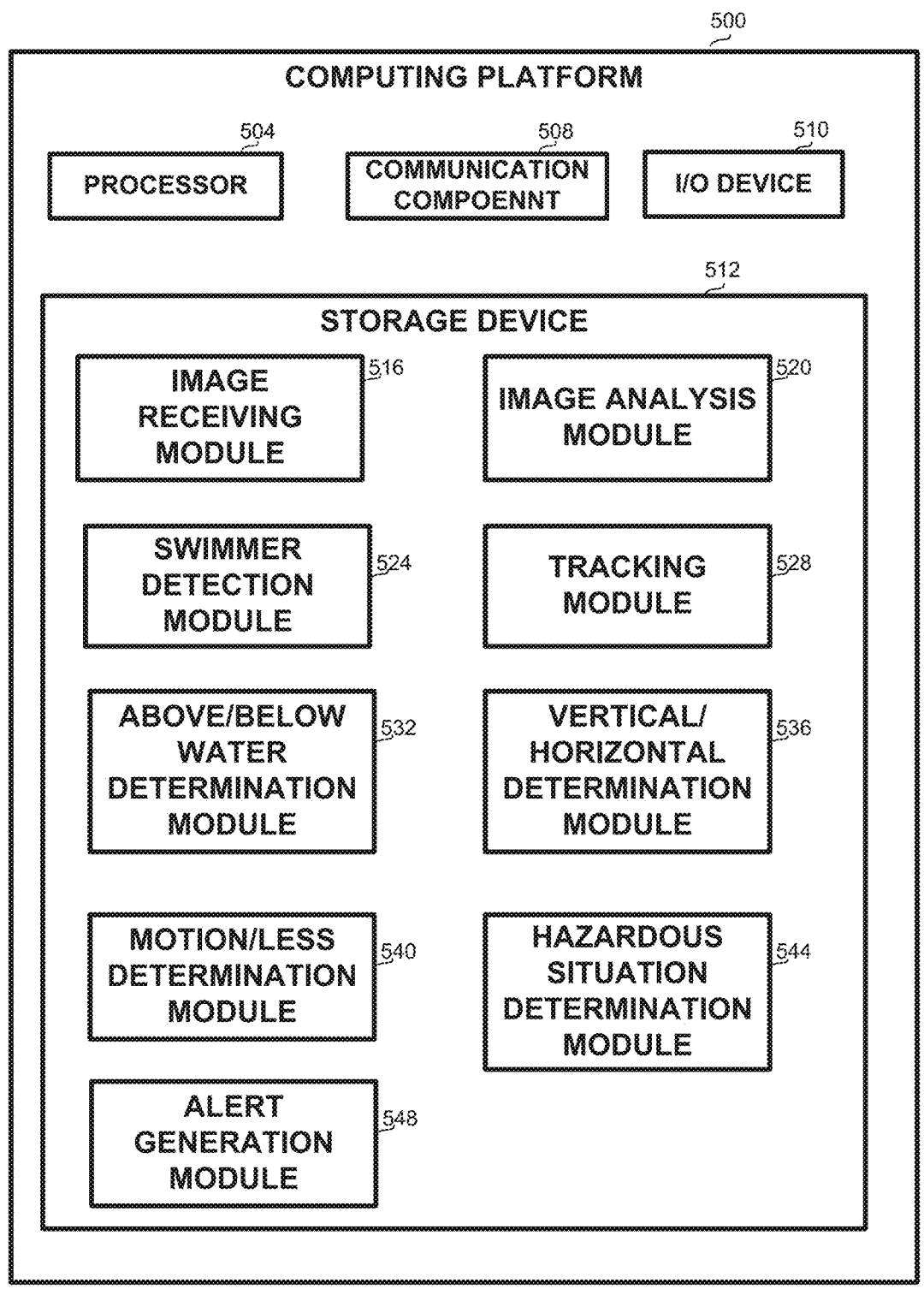
FIG. 5 shows a block diagram of a system for alerting against hazardous situations in a pool monitored by one or more overhead cameras, in accordance with some exemplary embodiments of the disclosed subject matter.

Referring now to FIG. 5, showing a block diagram of a system for alerting against hazardous situations in a pool monitored by one or more overhead cameras.

The system comprises one or more computing platforms 500. In some embodiments, Computing Platform 500 may be a server, and provide services to one or more pools, each monitored by one or more cameras.

Computing Platform 500 may comprise a Processor 504 which may be one or more Central Processing Unit (CPU), a microprocessor, an electronic circuit, an Integrated Circuit (IC) or the like. Processor 504 may be configured to provide the required functionality, for example by loading to memory and activating the modules stored on Storage Device 512 detailed below.

It will be appreciated that Computing Platform 500 may be implemented as one or more computing platforms which may be in communication with one another. It will also be appreciated that Processor 504 may be implemented as one or more processors, whether located on the same platform or not.

Computing Platform 500 may also comprise Input/Output (I/O) Device 510 such as a display, a pointing device, a keyboard, a touch screen, a speakerphone, or the like. I/O Device 510 may be utilized to receive input from and provide output to a user, for example calibrate the system, raise an alert, output statistics, or the like.

Computing Platform 500 may comprise a Communication Component 508 for communicating with other systems or devices, for example receiving images from one or more cameras or other computing platforms or storage devices. Communication Component 508 may be adapted to communicate via any communication channel, such as a Wide Area Network, a Local Area Network, intranet, Internet or the like, and by any communication protocol.

Computing Platform 500 may comprise a Storage Device 512, such as a hard disk drive, a Flash disk, a Random Access Memory (RAM), a memory chip, or the like. In some exemplary embodiments, Storage Device 512 may retain program code operative to cause Processor 504 to perform acts associated with any of the modules listed below or steps of the methods of FIGS. 2 and 3 above. The program code may comprise one or more executable units, such as functions, libraries, standalone programs or the like, adapted to execute instructions as detailed below.

Storage Device 512 may comprise Image Receiving Module 516, for receiving and optionally storing one or more images or parts thereof from a camera or a storage device, via Communication Component 508. The images may be received in any required known or proprietary format.

Storage Device 512 may comprise Image Analysis Module 520, for operating one or more image processing algorithms on one or more images, such as color histogram building or comparing, edge detection, contour detection, or the like.

Storage Device 512 may comprise Person Detection Module 524, for detecting one or more persons within a captured image. Detection may use one or more algorithms provided by Image Analysis Module 520.

Storage Device 512 may comprise Tracking Module 528, for tracking a person over a sequence of images. Tracking provides for comparing parameters or characteristics of the image or the person between images, determining a state of a person over time, or the like.

Storage Device 512 may comprise Above/Below Water Determination Module 532, for determining whether a person detected in one or more images is depicted below or above the water surface. In some embodiments, the determination can be made based on a sequence of images.

Storage Device 512 may comprise Vertical/Horizontal Determination Module 536, for determining whether a depicted person is in a vertical or horizontal position. In some embodiments, the determination can be made based on a sequence of images.

Storage Device 512 may comprise Motion or Motionless Determination Module 540, for determining whether a person is motionless for a period exceeding a predetermined duration. Determination can be made by comparing the location of the center of mass of a person, or another one or more points over a sequence of images. In some embodiments, despite small motions a person may be determined to be motionless.

Storage Device 512 may comprise Hazardous Situations Determination Module 544, for determining hazardous situations, such as a person submerged in water for at least a predetermined period of time, possibly with short periods in which the person is not submerged; a person submerged in water for at least a predetermined period of time, possibly with short periods in which the person is not submerged while being motionless; a person in a horizontal state for at least a predetermined period of time; a person in a horizontal state for at least a predetermined period of time and motionless; or others.

Storage Device 512 may comprise Alert Generation Module 548 for raising an alert if a hazardous situation is detected by Hazardous Situations Determination Module 544. Raising the alert may include setting off an alarm; sounding an alarm; generating a visual or vibrating alert; and notifying a life guard or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   obtaining a multiplicity of images taken by two or more overhead cameras overlooking a body of water having a surface, wherein the two overhead cameras comprise at least a first camera and a second camera, each of which has a captured portion of the body of water, the first camera and the second camera have at least a partial overlap between their respective captured portions of the body of water, wherein at least one of the first camera and the second camera is positioned at a height above 1.80 meters;
   detecting a person depicted in at least some images from the multiplicity of images;
   determining whether the at least some images depict the person in a substantially vertical position, wherein determining whether the person is in the substantially vertical position comprises determining whether a direction of the person as depicted in at least a subset of images coincides with a vertical direction at a location of the person as captured by the two or more overhead cameras, said determining performed upon at least one characteristic extracted from each image of the at least some images, wherein the at least one characteristic is selected from the group consisting of: a color histogram; an edge; an edge histogram; a gradient histogram; a contour edge between colors; a contour edge between shapes; a distinct feature; a unique pattern; a corner; a color co-occurrence matrix; and a texture, wherein said determining whether the person is in the substantially vertical position comprises:
   determining a length of a projection of the person as depicted in the at least some images, wherein the length of the projection is determined using a calibration of the first camera in which a vector between two points on an image is translated into an orientation on water surface;
   determining a height of the person as depicted in the at least some images; and
   subject to a ratio between the length and the height being below a predetermined value, determining that the person is in the substantially vertical position; and
   subject to determining that the person is not in the substantially vertical position in at least a predetermined number of images from the at least some images, performing an action, wherein said performing the action comprises sending an alert to a mobile device of a lifeguard.

2. The method of claim 1,
   wherein the first camera has a viewing angle of at most 70° between a first line connecting the first camera and a projection of the first camera on a plane containing the surface, and a second line connecting the first camera and a point on the surface farthest from the first camera;
   wherein the method further comprises:
   determining whether the at least some images depict the person below or above the surface of the body of water.

3. The method of claim 1, wherein each of the first and second cameras captures at least a part of a bottom surface the body of water.

4. The method of claim 2,
wherein said determining whether the at least some images depict the person below or above the surface comprises:
determining a probability that an image depicts the person below the surface; and
determining that the image depicts the person below the surface subject to the probability exceeding a predetermined threshold.

5. The method of claim 2, wherein said determining whether the at least some images depict the person below or above the surface comprises:
determining at least two probabilities that each of at least two images depict the person below the surface; and
determining that the at least two images depict the person below the surface in accordance with a joint estimation of the at least two probabilities.

6. The method of claim 2, wherein it is determined that the person is depicted above the surface in one or more images due to an image analysis error.

7. The method of claim 2, wherein it is determined that the person is depicted above the surface in one or more images due to a moving pattern consistent with drowning.

8. The method of claim 1, wherein said performing the action is further subject to a center of mass of the person being depicted as unchanged over a first period of time, which at least partially overlaps with a second time period during which the at least some images were captured.

9. The method of claim 1, wherein said determining whether the person is in the substantially vertical position further comprises:
determining that the person is in the substantially vertical position if the direction of the person is substantially vertical in the at least some images taken by the first camera, and if the direction of the person as depicted in at least a subset of images taken by the second camera coincides with the vertical direction at the location of the person as seen by the second camera in at least some images from the subset.

10. The method of claim 1, wherein the vertical direction at a location is determined using said calibration of the first camera, wherein a direction perpendicular to the surface as captured by the first camera is determined.

11. The method of claim 1 further comprising automatically performing said calibration of the first camera.

12. The method of claim 1, wherein the length of the projection is determined using said calibration of the first camera in which a vector between two points on an image is translated into an actual length.

13. The method of claim 1, wherein the first camera has a viewing angle of at most 70° between a first line connecting the first camera and a projection of the first camera on a plane containing the surface, and a second line connecting the first camera and a point on the surface farthest from the first camera.

14. The method of claim 1, wherein the first camera captures at least a part of a bottom surface of the body of water.

15. The method of claim 1, wherein said detecting comprises differentiating a background and foreground of each image of the at least some images.

16. The method of claim 1, wherein said determining whether the at least some images depict the person in the substantially vertical position further comprises:
determining a probability that an image depicts the person in a non-vertical position; and
determining that the person is not in a vertical position subject to the probability exceeding a predetermined threshold.

17. The method of claim 1, wherein said determining whether the at least some images depict the person in the substantially vertical position further comprises:
determining at least two probabilities that each of at least two images depict the person in a non-vertical position; and
determining that the at least two images depict the person in the non-vertical position in accordance with a joint estimation of the at least two probabilities.

18. The method of claim 1, wherein the action further comprises at least one-of: setting off an alarm; sounding an alarm; generating a visual alert; generating a vibrating alert; and notifying the life guard.

19. A system comprising:
a plurality of overhead cameras overlooking a body of water having a surface, wherein the plurality of overhead cameras comprises at least a first camera and a second camera, each of which has a captured portion of the body of water, the first camera and the second camera have at least a partial overlap between their respective captured portions of the body of water, wherein at least one of the first camera and the second camera is positioned at a height above 1.80 meters;
a mobile device associated with a lifeguard observing the body of water, the mobile device being configured to notify the lifeguard regarding a potential drowning event;
a computing platform that includes a processor, the computing platform being configured to:
obtain a multiplicity of images taken by the plurality of overhead cameras;
detecting a person depicted in at least some images from the multiplicity of images;
determining whether the at least some images depict the person in a substantially vertical position, said determining performed upon at least one characteristic extracted from each image, wherein the at least one characteristic is selected from the group consisting of: a color histogram; an edge; an edge histogram; a gradient histogram; a contour edge between colors; a contour edge between shapes; a distinct feature; a unique pattern; a corner; a color co-occurrence matrix; and a texture, wherein determining whether the person is in the substantially vertical position comprises:
determining that the person is in the substantially vertical position if a direction of the person is substantially vertical in the at least some images taken by the first camera, and if the direction of the person as depicted in at least a subset of the images taken by the second camera coincides with a vertical direction at a location of the person as seen by the second camera in the subset, wherein said determining whether the person is in the substantially vertical position further comprises:
determining a length of a projection of the person as depicted in the at least some images, wherein the length of the projection is determined using a calibration of the first camera in which a vector between two points on an image is translated into an orientation on water surface;
determining a height of the person as depicted in the at least some images; and
subject to a ratio between the length and the height being below a predetermined value, determining that the person is in the substantially vertical position and
subject to determining that the person is not in the substantially vertical position in at least a predetermined number of images from the at least some images, performing an action, wherein said performing the action comprises sending an alert to the mobile device, thereby generating a vibrating alert notifying the lifeguard of the potential drowning event.

* * * * *